United States Patent [19]

Staiger et al.

[11] 4,296,222
[45] Oct. 20, 1981

[54] MANUFACTURE OF POLY-α-OLEFINS

[75] Inventors: Gerhard Staiger, Bobenheim-Roxheim; Klaus Bronstert, Carlsberg, both of Fed. Rep. of Germany

[73] Assignee: BASF Aktiengesellschaft, Fed. Rep. of Germany

[21] Appl. No.: 780,764

[22] Filed: Mar. 24, 1977

[30] Foreign Application Priority Data

Apr. 13, 1976 [DE] Fed. Rep. of Germany ....... 2616260

[51] Int. Cl.³ .......................... C08F 4/66; C08F 10/06
[52] U.S. Cl. ............................... 526/119; 252/429 B; 526/139; 526/141; 526/142; 526/132; 526/351; 526/906
[58] Field of Search ............... 526/119, 139, 141, 142, 526/132

[56] References Cited

U.S. PATENT DOCUMENTS 3,937,691 2/1976 Staiger et al. ....................... 526/351

FOREIGN PATENT DOCUMENTS 1128724 10/1968 United Kingdom ................ 526/140
1370559 10/1974 United Kingdom ................ 526/142

Primary Examiner—Edward J. Smith
Attorney, Agent, or Firm—Keil & Witherspoon

[57] ABSTRACT

A process for the manufacture of poly-α-olefins by polymerizing α-olefins by means of a catalyst system comprising (1) a titanium-containing component obtained from (1.1) a compound of the formula $TiCl_3 \cdot \frac{1}{3}AlCl_3$ and (1.2) an organic electron donor, containing phosphorus, nitrogen and/or oxygen atoms, which has been milled with the compound of the formula $TiCl_3 \cdot \frac{1}{3}AlCl_3$ (1.1), in order to form a complex compound, the milling being carried out without assistants or additives in a vibratory ball mill under specific acceleration conditions and at a temperature which is from 4° to 10° C. below the temperature at which the particles of the material being ground begin to agglomerate, and (2) an aluminum-containing component, in which process the titanium-containing component (1) of the catalyst system used is one which has been treated, after milling and before polymerization, with (i) titanium tetrachloride and (ii) an ether and/or an ester.

8 Claims, No Drawings

MANUFACTURE OF POLY-α-OLEFINS

Our U.S. Pat. No. 3,937,691 discloses a process for the manufacture of poly-α-olefins in which α-olefins are polymerized at from 0° to 150° C. and 1 to 100 atmospheres absolute by means of a catalyst system comprising a compound of the formula $TiCl_3.\frac{1}{3}AlCl_3$, having a maximum particle diameter of 2 mm, which has been milled with an electron donor containing one or more phosphorus and/or nitrogen atoms so as to form a complex compound, and an aluminum-containing component. A specific molar ratio of titanium to electron donor, and a specific molar ratio of titanium to aluminum-containing component are adhered to in the catalyst system, and the milling of the compound of the formula $TiCl_3.\frac{1}{3}AlCl_3$ with the electron donor is carried out without assistants or additives in a vibratory ball mill using steel balls of a specific diameter, under specific acceleration conditions, for a period of from 10 to 70 hours at a temperature which is from 4° to 10° C. below the temperature at which the particles of the material being ground begin to agglomerate.

The process of the said patent differs from comparable processes of a different kind in particular in that both the productivity of the catalyst system and the proportion of the resulting poly-α-olefins, in particular polypropylene, which is insoluble in boiling n-heptane are relatively high.

It is an object of the present invention to provide a process of the type defined above in which the productivity of the catalyst system and/or the proportion of the resulting polyolefin which is insoluble in boiling n-heptane may be increased yet further.

We have found that this object is achieved by employing, for the process, a catalyst component which has been treated with titanium tetrachloride and an ether and/or ester after milling and before use in the polymerization reaction.

Accordingly, the present invention relates to a process for the manufacture of poly-α-olefins by polymerizing α-olefins at from 0° to 150° C. and pressures of from 1 to 100 atmospheres absolute by means of a catalyst system comprising (1) a titanium-containing component obtained from (1.1) a compound of the formula $TiCl_3.\frac{1}{3}AlCl_3$ having a maximum particle diameter of 2 mm and (1.2) an organic electron donor, containing phosphorus, nitrogen and/or oxygen atoms, which has been milled with the compound of the formula $TiCl_3.\frac{1}{3}AlCl_3$ (1.1) to form a complex compound, and (2) an aluminum-containing component consisting of a compound of the formula $Al(C_nH_{2n+1})_3$ or $Al(C_nH_{2n+1})_2Cl$ or a mixture of such compounds, n being, in each case, an integer from 2 to 6, with the provisos that the molar ratio of titanium contained in the compound of the formula $TiCl_3.\frac{1}{3}AlCl_3$ (1.1) to the electron donor (1.2) is from 10:5 to 10:1 and the molar ratio of titanium contained in the compound of the formula $TiCl_3.\frac{1}{3}AlCl_3$ (1.1) to the aluminum-containing compound (2) is from 10:5 to 10:300, the catalyst system employed being a system in the preparation of which the milling of the compound of the formula $TiCl_3.\frac{1}{3}AlCl_3$ (1.1) with the electron donor (1.2) has been carried out without assistants or additives in a vibratory ball mill with steel balls of from 6 to 60 mm diameter under a milling acceleration of from 30 to 70 m.sec$^{-2}$ for a period of from 10 to 70 hours at a temperature which is from 4° to 10° C. below the temperature at which the particles of the material being ground begin to agglomerate, in which process the titanium-containing catalyst component (1) of the catalyst system used is one which has been treated with (i) titanium tetrachloride and (ii) an ether and/or ester after milling and before the polymerization.

The catalyst component (1) can be treated by bringing it into direct contact, either simultaneously or successively, with (i) the titanium tetrachloride and (ii) with the ether and/or ester in a diluent. Suitable diluents are, in particular, hydrocarbons, e.g. hexane, heptane, cyclohexane, methylcyclohexane, benzene, toluene or mixtures of these liquids.

Advantageously, from 0.2 to 2.0 parts by weight of titanium tetrachloride are used per part by weight of the untreated catalyst component (1). The total amount of ether and/or ester used is advantageously from 0.15 to 1.5 parts by weight per part by weight of the untreated catalyst component (1).

A particularly suitable ether is diisopentyl ether, but diisopropyl ether, di-n-butyl ether, di-n-hexyl ether, di-ethyl-hexyl ether, di-benzyl ether, di-phenyl ether, anisole, phenetole, phenyl butyl ether and phenyl isoamyl ether may also be used.

Examples of suitable esters are isoamyl isovalerate, benzyl isovalerate, isoamyl acetate, isoamyl benzoate and triisoamyl borate.

The treatment is advantageously carried out at from 20° to 120° C. The preferred duration of the treatment is from 10 to 200 minutes.

After the treatment, the catalyst component (1) is separated off in the absence of air, washed several times with fresh suspension medium and dried under an inert gas. It can then be employed for the polymerization.

The α-olefins to be polymerized should, as usual, be as pure as possible. Suitable α-olefins are, in particular, α-olefins of 3 to 6 carbon atoms, specifically propene, but-1-ene, 4-methylpent-1-ene and hex-1-ene. The α-olefins may be employed as individual compounds or as mixtures of two or more such compounds or as mixtures with ethylene as the comonomer (for the manufacture of copolymers).

The compound of the formula $TiCl_3.\frac{1}{3}AlCl_3$ (1.1) is extensively used for the polymerization of α-olefins and is commercially available. Suitable electron donors (1.2) are conventional organic compounds containing phosphorus, nitrogen and/or oxygen atoms. Such electron donors are described, for example, in U.S. Pat. No. 3,186,977, Austrain Pat. Nos. 279,157, 285,932 and 285,933, German Published Application No. 1,595,303 and German Laid-Open Application Nos. 2,052,525 and 2,056,749. Examples of very suitable compounds are phosphines and phosphine oxides, primary, secondary and tertiary amines each of not more than 21 carbon atoms, and compounds containing ether or ester groups.

Specific examples of particularly suitable electron donors are triphenylphosphine, triphenylphosphine oxide, triisopropylphosphine, tri-n-butylphosphine, tri-n-butylphosphine oxide, hexamethylphosphoric acid triamide, pyridine, γ-picoline, dimethylamine, trimethylamine, butylamine, dibutylamine, diisobutylamine, tributylamine, diphenylamine, dicyclohexylamine, dimethylaniline, dibutylaniline, dimethylcyclohexylamine, dibutylcyclohexylamine, dibenzylamine and tribenzylamine.

Of the oxygen-containing compounds, esters and ethers are particularly suitable.

Suitable esters are ethyl acetate, butyl acetate, isoamyl acetate, isoamyl isovalerate, benzyl isovalerate, ethyl benzoate, butyl benzoate, isoamyl benzoate and triisoamyl borate.

Examples of suitable ethers are di-n-propyl ether, diisopropyl ether, di-n-butyl ether, di-n-pentyl ether, diisopentyl ether, di-n-hexyl ether, di-ethylhexyl ether, dibenzyl ether, anisole, phenetole, phenyl butyl ether, phenyl isoamyl ether and diphenyl ether.

Suitable compounds of the formula $Al(C_nH_{2n+1})_3$ and $Al(C_nH_{2n+1})_2Cl$ (2) are, once again, conventional compounds, especially those where n is an integer from 2 to 4. Specific examples of particularly suitable compounds of this type are aluminum triisobutyl, aluminum triethyl, aluminum diethyl-chloride and mixtures of these compounds.

The new process can, apart from the characterizing feature of the invention, be carried out in a conventional manner, for example by following, mutatis mutandis, the disclosures of the publications cited above.

The process is carried out with a catalyst system in the preparation of which the milling of the compound of the formula $TiCl_3 \cdot \frac{1}{3}AlCl_3$ (1.1) with the electron donor (1.2) has been carried out without assistants or additives in a vibratory ball mill with steel balls of from 6 to 60, preferably from 15 to 35, mm diameter, under a milling acceleration of from 30 to 70, preferably from 40 to 60, m.sec$^{-2}$, for a period of from 10 to 70, preferably from 20 to 50, hours at a temperature which is from 4° to 10°, preferably from 5° to 8,°C. below the temperature at which the particles of the material being ground begin to agglomerate.

All the above critical conditions must be observed simultaneously if the advantages provided by the new process are to be achieved. The most critical condition is that relating to the temperature. It means, in practical terms, that the milling must be carried out at as high a temperature as possible, but not at such a high temperature that the particles start to agglomerate. The suitable temperatures for each particular electron donor can easily be determined empirically, for example by a preliminary experiment in which the milling is started at a relatively low temperature, which is slowly raised, during milling, until the temperature at which the particles begin to agglomerate is reached.

EXAMPLE 1

(a) Preparation of the catalyst 50 g of the titanium-containing component (1) are prepared by milling $TiCl_3 \cdot \frac{1}{3}AlCl_3$, having a maximum particle size of 2 mm, and tributylphosphine, in the molar ratio of 6:1, in a vibratory ball mill without assistants or additives, using steel balls of 25 mm diameter, at a milling acceleration of 50 m.sec$^{-2}$, for a period of 30 hours at a temperature of 10° C., i.e. 6° C. below the temperature at which the particles of the material being ground begin to agglomerate. The ground material is suspended in 150 ml of heptane. 30 ml of diisopentyl ether and 8 ml of titanium tetrachloride are added and the mixture is stirred for 30 minutes at 70° C. The solid is then separated off on a glass frit under an inert gas, and is washed several times with heptane and dried.

40.1 g of catalyst component (1) are obtained; this material is used for the polymerization.

(b) Polymerization 1.9 parts of aluminum-diethyl chloride are added to a suspension of 1 part of the catalyst component (1) described above, in 500 parts of gasoline, and propylene is passed in for 3 hours at 65° C. and a pressure of 3 bars. The polymerization reaction is then stopped and the polymer is precipitated quantitatively with methanol and is dried in a vacuum cabinet dryer. 155 parts of polypropylene are obtained; 98.1% of this material are insoluble in boiling heptane.

EXAMPLE 2

(a) Preparation of the catalyst 50 g of the titanium-containing component (1) are prepared by milling $TiCl_3 \cdot \frac{1}{3}AlCl_3$ and isoamyl benzoate in a vibratory ball mill, as described in Example 1 (in this case the milling temperature of 10° C. is 9° C. below the temperature at which the particles of the material being ground begin to agglomerate). The ground material is suspended in 150 ml of heptane. 30 ml of diisopentyl ether and 8 ml of titanium tetrachloride are added. The mixture is stirred for 30 minutes at 70° C. and the solids are separated off. 48 g. of catalyst are obtained; this material is used for the polymerization.

(b) Polymerization 1 part by weight of aluminum-diethyl chloride is added to a suspension of 1 part of the catalyst component (1), obtained according to 2 (a), in 500 parts of gasoline. Propylene is polymerized as described in Example 1 and 165 parts of polypropylene are obtained; 97.5% of this material are insoluble in boiling heptane.

We claim:

1. In a process for the manufacture of an α-olefin polymer by polymerizing one or more α-olefins at from 0° to 150° C. and from 1 to 100 atmospheres absolute by means of a catalyst system comprising (1) a titanium-containing component obtained from (1.1) a compound of the formula $TiCl_3 \cdot \frac{1}{3}AlCl_3$ having a maximum particle diameter of 2 mm and (1.2) an organic electron donor, containing one or more phosphorus, nitrogen and/or oxygen atoms, which has been milled with the compound of the formula $TiCl_3 \cdot \frac{1}{3}AlCl_3$ (1.1) to form a complex compound, and (2) an aluminum-containing component consisting of a compound of the formula $Al(C_nH_{2n+1})_3$ or $Al(C_nH_{2n+1})_2Cl$ or a mixture of such compounds, n being, in each case, an integer from 2 to 6, with the provisos that the molar ratio of titanium contained in the compound of the formula $TiCl_3 \cdot \frac{1}{3}AlCl_3$ (1.1) to the electron donor (1.2) is from 10:5 to 10:1 and the molar ratio of titanium contained in the compound of the formula $TiCl_3 \cdot \frac{1}{3}AlCl_3$ (1.1) to the aluminum-containing component (2) is from 10:5 to 10:300, the catalyst system employed being a system in the preparation of which the milling of the compound of the formula $TiCl_3 \cdot \frac{1}{3}AlCl_3$ (1.1) with the electron donor (1.2) has been carried out without assistants or additives in a vibratory ball mill with steel balls of from 6 to 60 mm diameter under a milling acceleration of from 30 to 70 m.sec$^{-2}$ for a period of from 10 to 70 hours at a temperature which is from 4° to 10° C. below the temperature at which the particles of the material being ground begin to agglomerate, the improvement wherein the titanium-containing catalyst component (1) of the catalyst system used is one which has been treated with from 0.2 to 2.0 parts by weight of (i) titanium tetrachloride per part by weight of the untreated catalyst component (1) and (ii) from 0.15 to 1.5 parts by weight of an ether and/or ester per part by weight of the untreated catalyst component (1) after milling and before the polymerization.

2. A process as claimed in claim 1, wherein the catalyst component (1) used is one which has been brought into direct contact either simultaneously or successively with the titanium tetrachloride and the ether and/or ester in an inert diluent.

3. A process as claimed in claim 1, wherein the catalyst component (1) used is one which has been treated with the titanium tetrachloride and the ether and/or ester at from 20° to 120° C. for 10 to 200 minutes.

4. A process as claimed in claim 1, wherein an α-olefin of 3 to 6 carbon atoms is homopolymerized or copolymerized with one or more α-olefins of 2 to 6 carbon atoms.

5. A process as claimed in claim 1, wherein the catalyst component (1) used is one which has been milled with a phosphine, phosphine oxide, primary, secondary or tertiary amine of not more than 21 carbon atoms or a compound containing an ether or ester group, as the electron donor.

6. A process as claimed in claim 1 wherein said catalyst component (1) is treated with (i) titanium tetrachloride and (ii) diisopentyl ether, diisopropyl ether, di-n-butyl ether, di-n-hexyl ether, di-ethylhexyl ether, dibenzyl ether, di-phenyl ether, anisole, phenetole, phenyl butyl ether or phenyl isoamyl ether.

7. A process as claimed in claim 1 wherein said catalyst component (1) is treated with (i) titanium tetrachloride and an ester.

8. A process as claimed in claim 7 wherein said ester is isoamyl isovalerate, benzyl isovalerate, isoamyl acetate, isoamyl benzoate or triisoamyl borate.

* * * * *